(12) United States Patent
Warzelhan et al.

(10) Patent No.: US 11,875,514 B2
(45) Date of Patent: Jan. 16, 2024

(54) ANALYSIS DEVICE, MONITORING ASSEMBLY COMPRISING THE ANALYSIS DEVICE, AND METHOD FOR DETERMINING A BACKGROUND IMAGE WHICH IS PRIVACY-COMPLIANT

(71) Applicant: Robert Bosch GmbH, Stuttgart (DE)

(72) Inventors: Jan Karl Warzelhan, Bad Salzdetfurth (DE); Michael Christern, Grevesmuehlen (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 17/431,329

(22) PCT Filed: Feb. 5, 2020

(86) PCT No.: PCT/EP2020/052793
§ 371 (c)(1),
(2) Date: Aug. 16, 2021

(87) PCT Pub. No.: WO2020/169340
PCT Pub. Date: Aug. 27, 2020

(65) Prior Publication Data
US 2022/0138958 A1 May 5, 2022

(30) Foreign Application Priority Data
Feb. 18, 2019 (DE) ..................... 10 2019 202 103.4

(51) Int. Cl.
*G06T 7/00* (2017.01)
*G06T 7/194* (2017.01)
(Continued)

(52) U.S. Cl.
CPC ................ *G06T 7/194* (2017.01); *G06T 7/11* (2017.01); *G06T 7/90* (2017.01); *G06V 20/53* (2022.01)

(58) Field of Classification Search
CPC .. G06T 7/194; G06T 7/11; G06T 7/90; G06V 20/53; G06V 20/52; G06V 40/103; G06Q 30/0201
See application file for complete search history.

(56) References Cited

U.S. PATENT DOCUMENTS 10,832,416 B2 * 11/2020 Tao .................. G06V 20/53
2019/0205659 A1 * 7/2019 Cuban .............. G06V 20/41
2021/0279475 A1 * 9/2021 Tusch ............... H04L 63/0861

FOREIGN PATENT DOCUMENTS

DE 102008001126 A1 10/2009
DE 102016222134 A1 5/2018

OTHER PUBLICATIONS

Translation of International Search Report for Application No. PCT/EP2020/052793 dated Mar. 23, 2020 (3 pages).
(Continued)

*Primary Examiner* — Ping Y Hsieh
(74) *Attorney, Agent, or Firm* — Michael Best & Friedrich LLP

(57) ABSTRACT

The invention relates to an analysis device (6) for analyzing image data of a camera (5), wherein the image data has a plurality of individual images B, comprising a device (7) for determining a number of persons, said device (7) for determining a number of persons being designed to determine the number of persons P in the individual images B; an image selection device (8), said image selection device (8) being designed to select individual images B on the basis of the number of persons P and provide the selected individual images B and the corresponding number of persons P as analysis data A; a device (10) for identifying persons, said device (10) for identifying persons being designed to mark persons P1, P2, P3 as image sections A1, A2 in the individual images B on the basis of the analysis data A and provide same as mask images M; and an image combination
(Continued)

device (10), said image combination device (10) being designed to replace the marked image sections A1, A2 with corresponding image sections A1', A2' without persons, wherein a maximum number of persons Pmax is stored in the image selection device (8), and the image selection device (8) is designed to select the individual images B in which the corresponding number of persons P is less than or equal to the stored maximum number of persons Pmax.

14 Claims, 4 Drawing Sheets

(51) Int. Cl.
*G06T 7/11* (2017.01)
*G06T 7/90* (2017.01)
*G06V 20/52* (2022.01)

(56) References Cited

OTHER PUBLICATIONS

Wikipedia, "People Counter", <https://en.wikipedia.org/w/index.php?title=People_Counter&oldid=826216264#video_counting>, Feb. 2018, 8 pages.

Wikipedia, "Image Segmentation", <https://en.wikipedia.org/w/index.php?title=Image_segmentation&oldid=800585998>, Sep. 2017, 20 pages.

Wikipedia, "Image Editing", <https://en.wikipedia.org/w/index.php?title=Image_editing&oldid=880437670>, Jan. 2019, 15 pages.

* cited by examiner

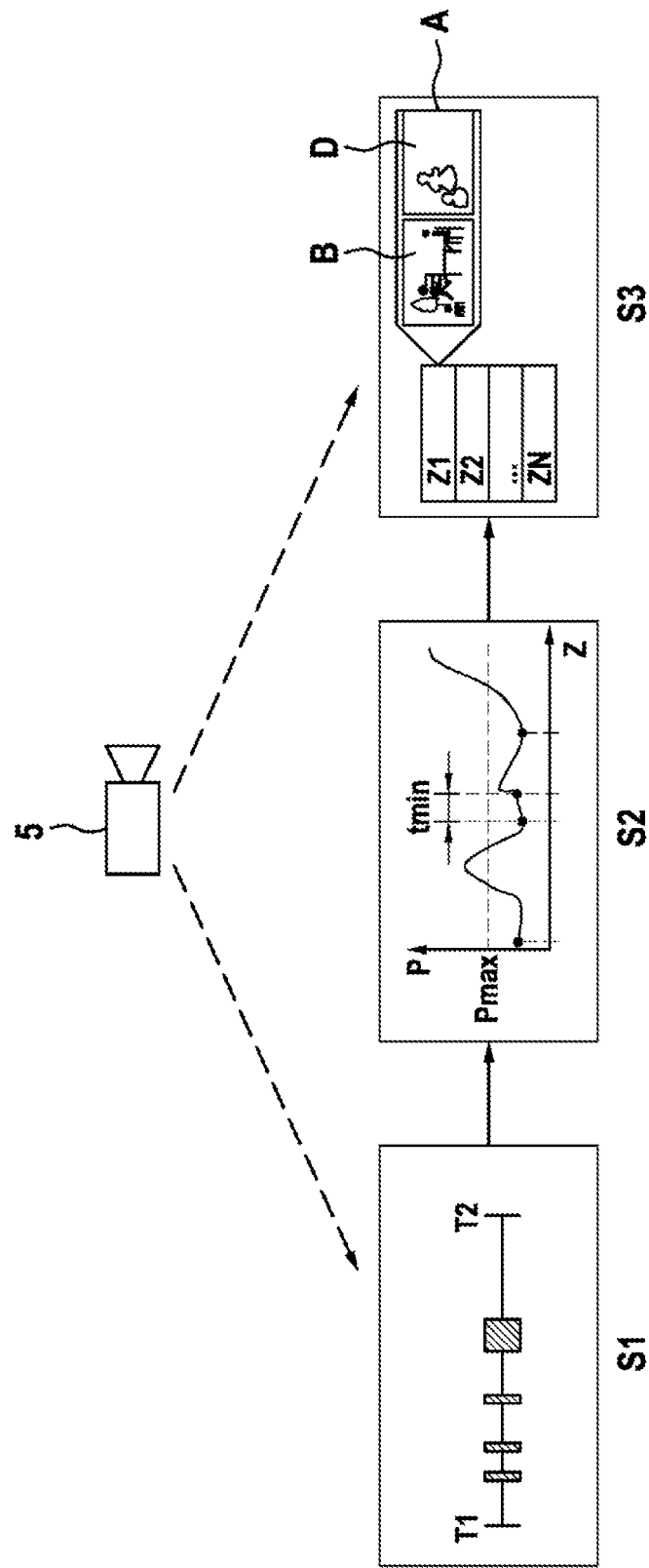

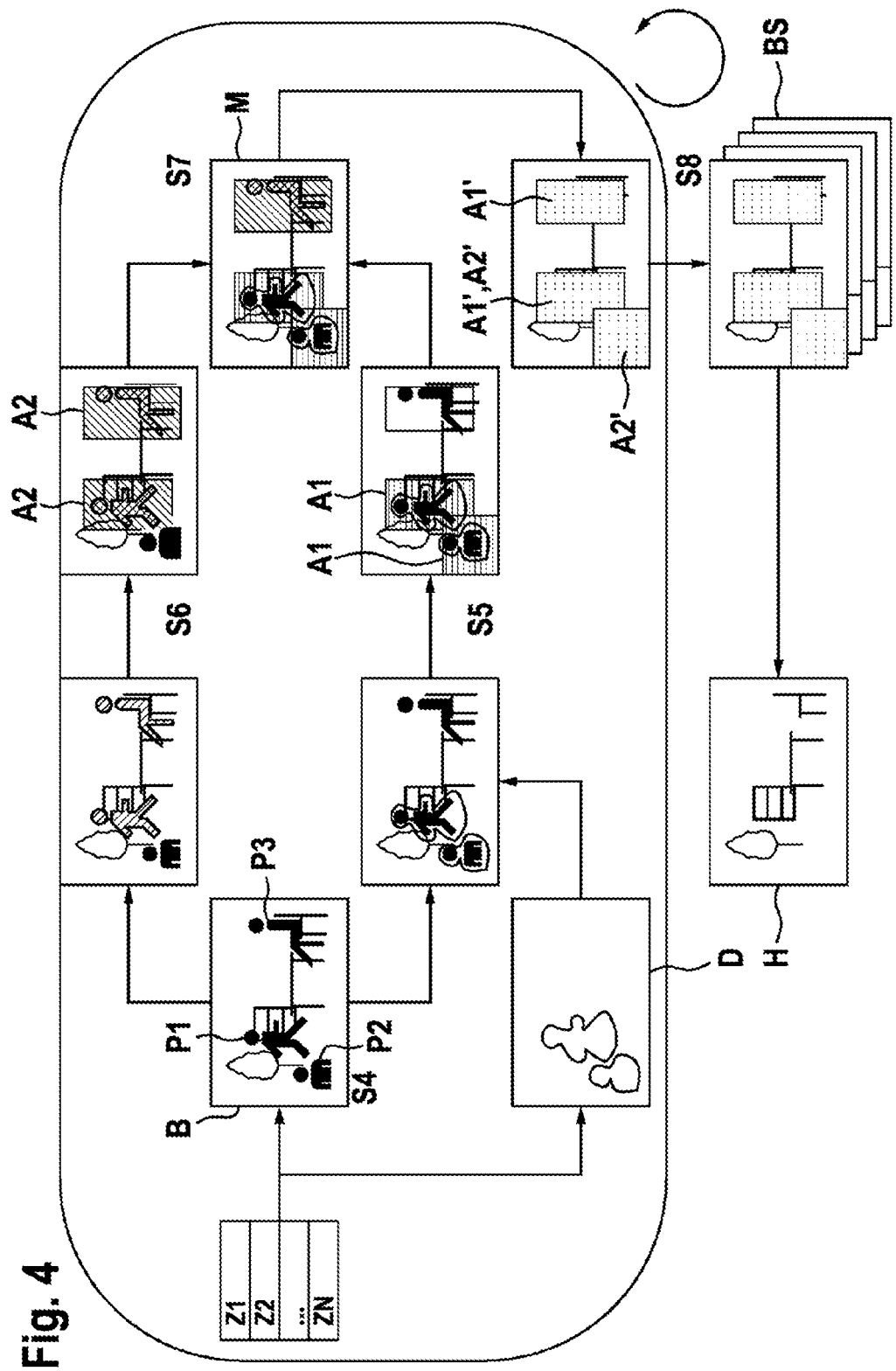

ANALYSIS DEVICE, MONITORING ASSEMBLY COMPRISING THE ANALYSIS DEVICE, AND METHOD FOR DETERMINING A BACKGROUND IMAGE WHICH IS PRIVACY-COMPLIANT

BACKGROUND

An analysis device for analyzing image data of a camera is proposed. A monitoring assembly comprising the analysis device and a method for determining a background image which is privacy-compliant are furthermore proposed.

The document DE 10 2008 001 126 A1, which probably forms the closest prior art, discloses an inventory taking module for a video monitoring system, wherein the video monitoring system comprises at least one monitoring camera which is directed and/or directable at a monitoring region, in particular a storage and/or retail region, with products, comprising a detection unit configured for detecting the products, wherein position information and identification information of the detected product are ascertained during detection. Said module comprises an assigning unit configured to model a spatial distribution of the products in the monitoring region by way of the position information and the identification information from a plurality of detected products.

SUMMARY

An analysis device is proposed. A monitoring assembly and a method are furthermore proposed. Preferred and/or advantageous embodiments of the invention are evident from the dependent claims, the description and the appended figures.

The starting point of the invention is the fact that a large number of businesses and stores are monitored by way of video technology and/or product technology. The performance of the business is intended to be improved by means of the monitoring. To that end, analysis devices are used which can carry out in-store analytics, also called retail analysis. Customer behavior in retail trade or in retail business can be analyzed and evaluated by means of such analyses. The data obtained can be aggregated over time and/or else over positions and provided to a user, for example a retail business manager, an advertising department or data analysts. The analysis data can be provided by means of graphical output (dashboard) and/or on the basis of tables. On the basis of the analysis data, the user can then optimize the product arrangement, the shelving arrangement or other parameters such that customer behavior is controlled as desired.

The invention relates to an analysis device configured and/or suitable for analyzing image data of at least or exactly one camera. In particular, the analysis device is configured to ascertain and/or to provide a background image which is privacy-compliant on the basis of the image data. In particular, the camera is used for image-technological and/or video-technological monitoring of a monitoring region. The monitoring region is preferably a storage and/or retail space. In this case, the monitoring region recorded by the camera and/or the cameras is provided as the image data, in particular as video data. In this case, the analysis device can be configured as a separate computing unit. Alternatively, however, the analysis device can also at least partly form an integral constituent of the camera.

The image data comprise a plurality of images. In particular, the image data comprise a plurality of temporally successive and/or spaced apart frames. In particular, the analysis device can access the image data in real time and/or a recording of the image data.

The analysis device comprises a unit for determining a number of persons. In particular, the unit for determining a number of persons comprises an interface for accepting the image data. The unit for determining a number of persons is configured to determine a number of persons in the images. In particular, for each individual image the unit for determining a number of persons can describe the associated persons by way of their number and provide same as metadata. In particular, besides the information about the number of persons in the image, the metadata can for example also comprise position information and/or a movement behavior/pattern concerning the imaged persons. Preferably, the unit for determining a number of persons can evaluate the number of persons in the images on the basis of digital or analog image processing algorithms.

The analysis device comprises an image selection unit. In particular, the image selection unit comprises an interface for accepting the frames and the associated metadata. In this case, the image selection unit is configured, on the basis of the number of persons ascertained by the unit for determining a number of persons, to select images, in particular at least or exactly one frame, from the image data and to provide them together with the associated metadata as analysis data. In particular, a selection method carried out by the image selection unit consists in a plurality of frames being compared with one another on the basis of the associated number of persons and a selection decision being taken on the basis of defined selection criteria stored in the image selection unit.

Furthermore, the analysis device comprises a person identifying unit. In particular, the person identifying unit comprises an interface for accepting the analysis data. The person identifying unit is configured to identify persons in the frames and to mark same as image segments in the frames. The frames marked with the image segments are subsequently provided as mask images. In particular, the person identifying unit can mark the persons in the image plane of the corresponding frame by means of a graphical boundary.

The analysis device comprises an image combining unit. In particular, the image combining unit comprises an interface for accepting the mask images marked with the image segments. The image combining unit is configured to replace the image segments marked with persons in at least or exactly one of the mask images with corresponding image segments without persons. In particular, replacing the image segments is carried out by comparing a plurality of the mask images with one another or with a stored frame, wherein preferably all marked image segments with persons are replaced with corresponding image segments without persons. This makes it possible to ensure that the background image generated does not actually image any persons, and so the background image which is privacy-compliant is generated and provided for further use. The background image which is privacy-compliant can be made available to a database unit and/or a display unit manually or automatically, for example. Preferably, the background image which is privacy-compliant is used for superimposition and/or combination with a two-dimensional model, e.g. a floor plan and/or site plan.

The advantage of the invention here is that a minimum of data to be transferred can be realized by means of a small selection of frames, which moreover have a reduced amount of persons. This is particularly advantageous in a cloud-based application of the analysis device, since the volume of data to be transferred can be significantly reduced and thus the data transfer can be accelerated and/or storage space can be saved. Moreover, it can be ensured that the analysis data provided by the image selection unit already have no or at least only a small number of persons.

One development of the invention proposes that a maximum number of persons is stored in the image selection unit. In particular, the maximum number of persons corresponds to a number of persons that is permitted maximally to appear in a frame of the image data. In this case, the image selection unit is configured to select the images in which the associated number of persons is less than or equal to the stored maximum number of persons. In particular, the image selection unit selects the images at temporally defined intervals. Preferably, the image selection unit compares the frames with one another, in particular with regard to their number of persons, wherein the image selection unit makes available as analysis data the frames in which the associated number of persons is less than or equal to the stored maximum number of persons and/or is minimal in comparison with the other frames. Particularly preferably, the images which have no persons or only few detected persons are preferably provided as the analysis data.

One configuration of the invention provides for the image selection unit to be configured to select at least or exactly one frame in at least or exactly one defined time range in which a reduced amount of persons is to be expected. Preferably, the time period of the time range and/or the number of time ranges and/or the temporal intervals between a plurality of time ranges can be set in a variable manner. In particular, the at least one time range is defined preferably at least once per day or per week or per month or per year. Alternatively or optionally supplementarily, the at least one time range is defined before and/or after a defined period of time or point in time. Particularly preferably, the time range is defined directly or with a temporal separation before an opening time and/or after a closing time. Specifically, the time range is set such that the monitoring region still contains no or at least only a few persons, but it is already optimized, e.g. illuminated, for the recording.

It is thus possible to ensure that an image that is necessary for the further image processing, in particular a visually appealing image, can be recorded by the camera. Moreover, a minimal amount of persons in the monitoring region can be ensured by the definition of the time range.

One development provides for the image selection unit to be configured to analyze a plurality of the frames at different points in time in the defined time range, in particular with regard to their number of persons. In particular, the image selection unit is configured to analyze in each case one or more of the frames with regard to the associated metadata at different, preferably random or temporally defined, points in time within the time range. Preferably, the image selection unit can sort the points in time with regard to the associated number of persons. Specifically, the associated frame can be assigned and/or loaded at at least or exactly one point in time having preferably the smallest number of persons. Specifically, the number of assigned and/or assignable frames is equal to the number of points in time.

A minimal time interval between the points in time is stored in the image selection unit. In particular, the image selection unit is configured to select or to analyze the analysis data, in particular the frames and/or the metadata, at points in time which have a time interval that is greater than or equal to the minimum time interval. In particular, the image selection unit is configured to search for points in time which are separated from one another at least by the minimum time interval and/or at which the number of persons in the imaged scene (frame) is minimal and/or is less than or equal to the maximum number of persons. With the knowledge concerning how many persons are present in the associated frame at what point in time or what points in time contain the fewest persons, the associated frame can subsequently be loaded.

The probability of the presence of enough background data is ensured by the minimum time interval stored in the image selection unit and also the stored maximum number of persons. If persons are situated in the scene, but they have not been recognized by the person identifying unit, the probability that the persons have moved away in the imaged scene and thus there is no longer any person situated at that location can be increased by the provision of further frames with a greater temporal interval. The frame or the image segment can subsequently be used for determining the background image which is privacy-compliant. It is thus possible to ensure the best possible distribution and/or diversity between the results.

A further preferred configuration of the invention provides for the image combining unit to be configured to replace the marked image segments in the mask images with a mean value of the color values of the corresponding image segments of the further mask images. In particular, the image combining unit is used for calculating the background image which is privacy-compliant. By way of example, for each pixel position, the image calculating module can sort all pixel values of the different analysis data according to their color value and can then determine a median pixel value for calculating a median image as the background image which is privacy-compliant. In particular, the median image is calculated by means of a median value operator.

Since a certain number of persons are always present in the image, e.g. in the case of 24 hour opening times, and/or not every person as such is recognized or they are only recognized too late, a median image can be output as the background image which is privacy-compliant despite the presence of persons in the individual mask images.

One concrete development provides for the image calculating module to be configured to exclude the image segments marked with persons at the respective image position of the further mask images during a calculation of the mean value. In particular, the image selection unit is configured to ignore the image segments marked with persons during the calculation of the mean value of all color values per image position. Since it is now possible to assume no foreground objects (persons), it is then also possible to calculate the mean value image instead of the median image. Preferably, the mean value image is calculated per pixel by means of a mean value operator.

One development provides for the person identifying unit to comprise a masking module, wherein the masking module is configured to mark the associated persons in the associated frames on the basis of the analysis data, the image segments thereby being formed. In particular, the image regions in which moving persons were identified can be enclosed with an ample order by the masking module. Preferably, the image regions having persons can be enclosed by rectangular or polygonal boxes. Depending on the representation, the boxes can be represented in the image plane as two- or three-dimensional boxes. Particularly preferably, said boxes are larger by a defined percentage than the person actually imaged. As a result, it is possible to ensure a complete delimitation of the persons in the associated frame.

An alternative or optionally supplementary development provides for the person identifying unit to comprise an AI module, wherein the AI module is configured to learn and/or to improve the detection of persons in the frames. In particular, the AI module is configured to analyze and/or to evaluate image regions in the frames at which a person is suspected, wherein upon detection of a person the corresponding regions in the associated frames are marked. Specifically, the AI module is configured to learn features of persons and to detect the persons on the basis of the features. In particular, the AI module is configured to process the corresponding frames by means of a neural network (also known as so-called "deep learning") and to evaluate those locations in the image at which a person is suspected. By way of example, the AI module is configured to process the frames by means of a deep learning segmentation algorithm, the result that is output being a pixel-by-pixel classification in the image as to where persons are situated. These image regions are subsequently marked by masks enclosing the persons.

A further concrete configuration of the invention provides for the person identifying unit to be configured to combine the image segments marked by the masking module and by the AI module and to provide same as the mask image. In particular, the person identifying unit is configured to compare all marked image segments with one another, and to effect a masking of all image regions at which a person was identified. In this case, a plurality of mask images can be provided by the person identifying unit and be added to a buffer/image stack. Specifically, mask images can be provided until the amount thereof is sufficient to ensure that all or enough frames provided by the image selection unit have been processed in order that possible errors or persons not recognized can be computationally extracted in the subsequent process steps.

A further implementation provides for the analysis device to comprise a database. The database is configured to store at least or exactly one of the frames with the associated number of persons and/or the associated point in time as analysis data. In particular, the image selection unit is configured, at each point in time, to combine the associated frames and the associated metadata and to store same as analysis data in the database. Particularly preferably, at each defined point in time, the corresponding frame and/or the associated metadata from the camera, e.g. from the recording, can be loaded and stored in the database. In particular, the analysis data stored in the database can then be processed individually, in particular in a loop, by the person identifying unit and the image combining unit.

The invention further relates to a monitoring assembly configured and/or suitable for monitoring a monitoring region. Preferably, the monitoring assembly comprises the analysis device as claimed in any of the preceding claims or as has already been described above. The monitoring assembly comprises at least one or a plurality of cameras. The camera is configured to capture a monitoring region and to provide the latter as the image data. In particular, the analysis device for analyzing the monitoring region is connected to the at least one camera, preferably to all the cameras, in terms of signaling. Specifically, the monitoring assembly comprises a plurality of the cameras, wherein each of the cameras is configured to optically monitor the monitoring region. Preferably, the optical recordings of the cameras are provided to the analysis device as the image data, wherein the analysis device is configured to ascertain an associated background image which is privacy-compliant for each of the recordings.

A further concretization provides for the monitoring region to be configured as the retail space. In particular, the retail space is a space portion of a retail and/or storage space, e.g. of a store, shopping center or retail business. The monitoring assembly is configured to analyze a retail behavior in the retail space. In particular, the monitoring assembly can analyze the retail space with regard to products, product performance, customer flows and/or sales data and provide same preferably as sales and/or retail data.

The invention further relates to a method for determining a background image which is privacy-compliant in particular with the analysis device and/or with the monitoring assembly as have already been described above. Preferably, the method is configured for carrying out the following steps, wherein:

image data are transferred from a camera to the analysis device, wherein the image data comprise a plurality of images;

a unit for determining a number of persons in the analysis device determines a number of persons in the images;

an image selection unit of the analysis device selects the images in which in particular an associated number of persons is less than or equal to a maximum number of persons stored in the image selection unit, and provides the selected images as analysis data, a person identifying unit identifies persons in the analysis data and marks same as image segments in the analysis data, an image combining unit replaces the image segments marked with persons with corresponding image segments without persons, such that a background image which is privacy-compliant is generated.

BRIEF DESCRIPTION OF THE DRAWINGS

Further advantages, effects and configurations are evident from the accompanying figures and the description thereof. In the figures here:

FIG. 3 shows a schematic flow diagram for calculating a background image which is privacy-compliant by means of the analysis device;

FIG. 4 shows a continuation of the flow diagram in an illustration in the same way as FIG. 3.

DETAILED DESCRIPTION

Figure 1:
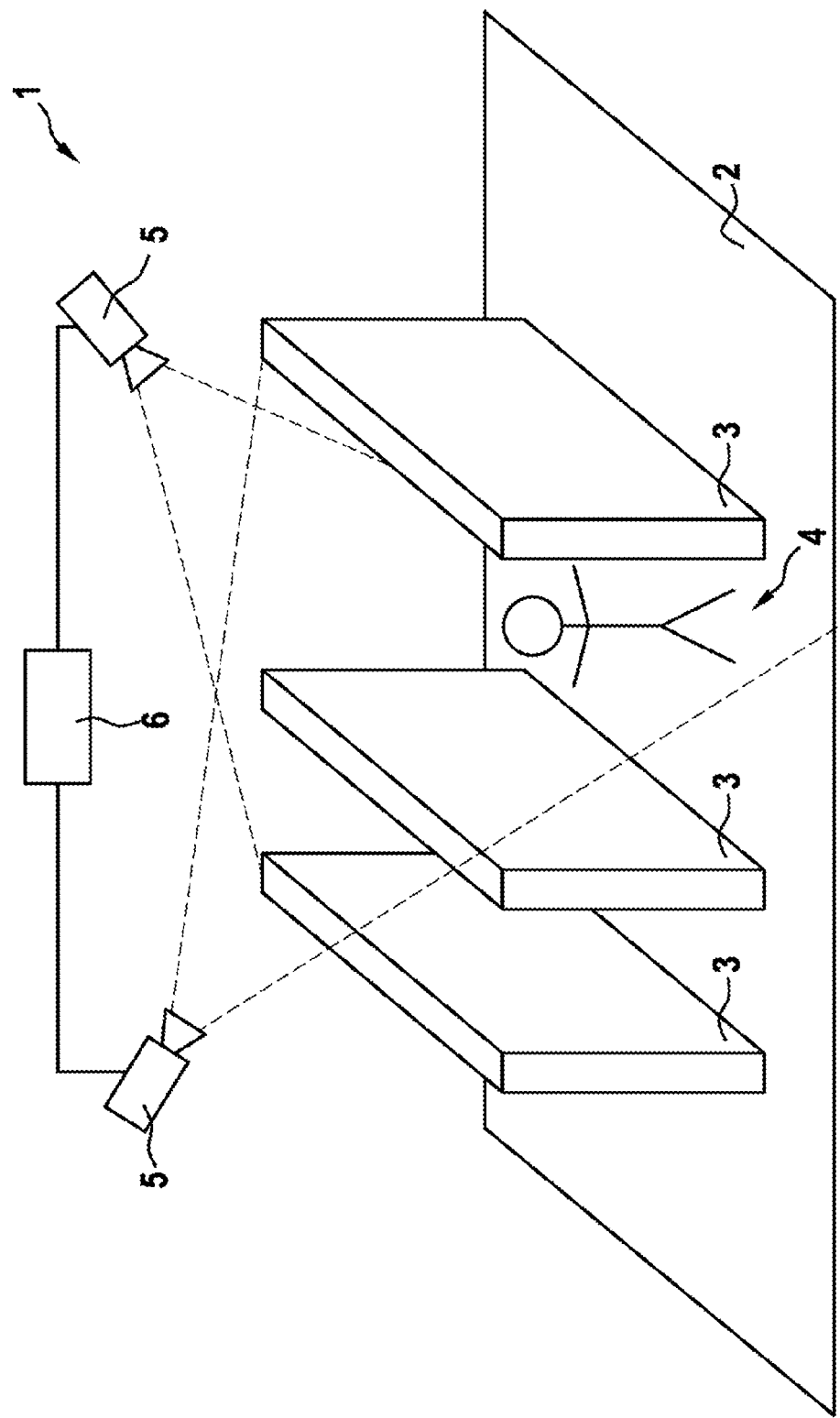
FIG. 1 shows a highly schematic illustration of a monitoring assembly for monitoring a monitoring region.

FIG. 1 shows a highly schematic illustration of a monitoring assembly 1 used for monitoring a monitoring region 2. The monitoring assembly 1 is installed in a store or a department store, for example. In the exemplary embodiment shown, the monitoring region 2 is configured as a retail space of the store, wherein a plurality of goods presenters 3, e.g. shelves, tables, stands, counters, etc., for goods presentation are installed in the retail space. Between the goods presenters 3, a network of paths on which persons 4 can move is predefined in the retail space 2. The at least one person 4 interacts with the goods presenters 3 and the products arranged therein. By way of example, the person 4 chooses products, takes them with him/her and traverses a path in the monitoring region 2. The movement of the person 4, the buying behavior and additional information are monitored by the monitoring assembly 1.

The monitoring assembly 1 comprises a plurality of cameras 5 configured to optically monitor the monitoring region 2. The cameras 5 track and/or capture the person 4 in the monitoring region 2. Furthermore, the presence, removal and/or resorting of products and/or goods presenters 3 can be traced and analyzed by means of the cameras 5. The optical recordings of the cameras 5 are provided to an analysis device 6 as image data, in particular as video data.

The analysis device 6 can be configured, inter alia, to analyze, to monitor and/or to store the behavior of the persons 4, the product performance of products and/or further information regarding the monitoring region 2. Preferably, however, the analysis device 6 is configured to evaluate the image data communicated by the cameras 5 and to generate a background image which is privacy-compliant, and which is made available for further processes of retail and/or product analysis. By way of example, the background image which is privacy-compliant can be superimposed on a floor plan or site plan of the retail space. In this case, the analysis device 6 is configured to carry out a method which ensures in a plurality of stages that the background image generated does not actually image any persons 4 in the image data recorded by the cameras 5 and at the same time reduces the bandwidth or the volume of data per camera 5 to a minimum if these are connected to the analysis device 6 e.g. by way of a cloud-based solution.

Figure 2:
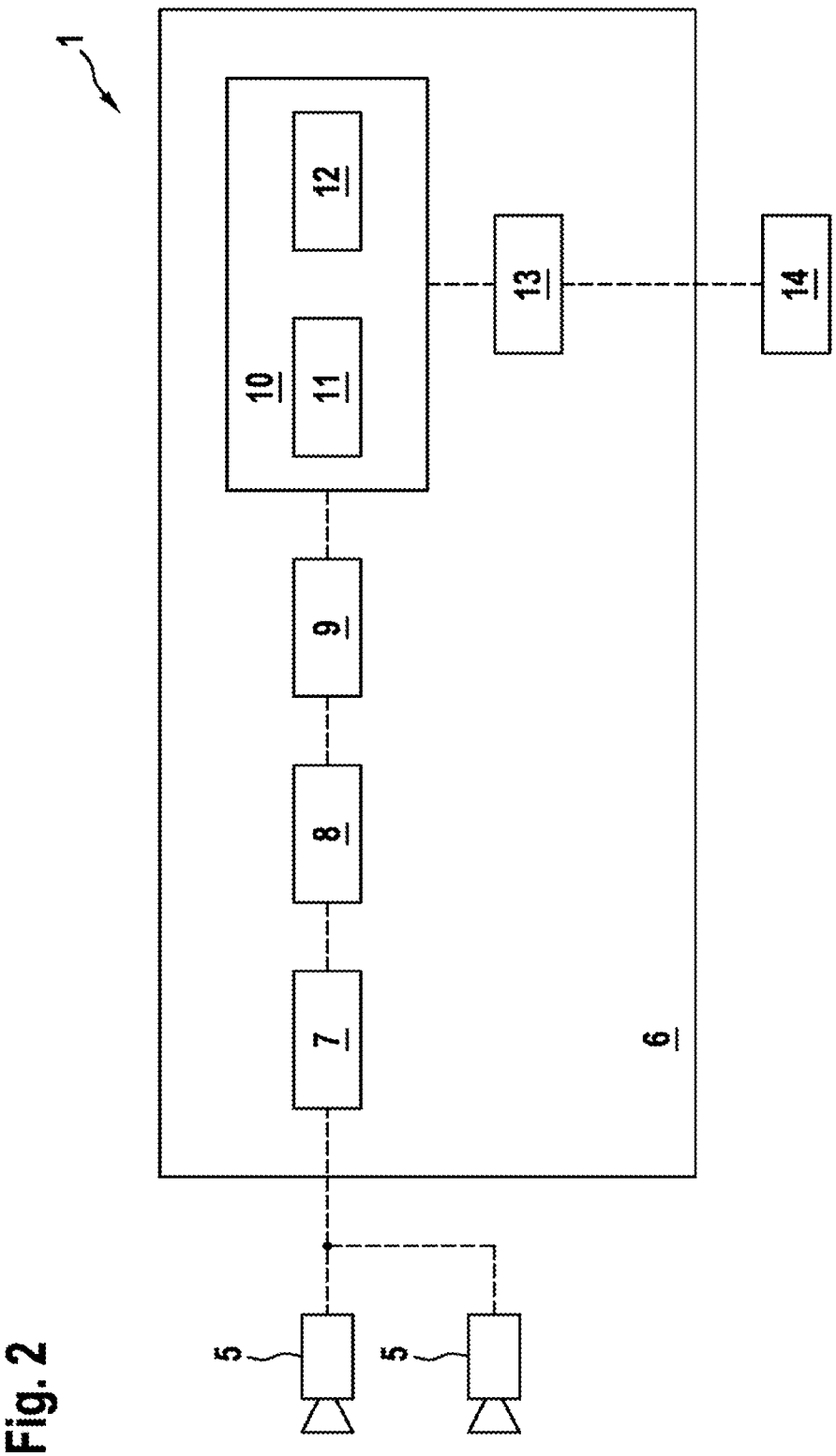
FIG. 2 shows a schematic block illustration of the monitoring assembly with an analysis device as one exemplary embodiment of the invention.

FIG. 2 shows the monitoring assembly 1, the data streams of which are shown on the basis of a schematic block illustration as one exemplary embodiment of the invention. In the event of a request for a background image which is privacy-compliant, e.g. "PrivacyConformBackground" via REST Call, proceeding from the cameras 5 the image data can be communicated to the analysis device 6. This can be effected automatically or triggered manually, for example every day, once per week or once per month per camera 5, depending on how up to date the background image has to be.

The image data comprise a plurality of temporally successive and/or separated images (frames). In addition to the image data stream, the cameras 5 can additionally supply a metadata stream, which, at each point in time in the recording, describes the associated moving objects, in particular the persons 4, by means of position data.

The analysis device 6 comprises a unit 7 for determining a number of persons, said unit being configured to calculate an associated number of persons in the corresponding frame on the basis of the metadata, in particular the position data, at each point in time. For this purpose, the unit 7 for determining a number of persons can access the image data and the metadata of the cameras 5 live or a recording thereof.

The analysis device 6 comprises an image selection unit 8 configured, on the basis of the number of persons, to select and load images that preferably have a minimum number of persons. In this case, the image selection unit 8 can examine the metadata with regard to the number of persons at various points in time, preference being given to those images in which the number of persons 4 present in the imaged scene (frame) is minimal.

In addition, it is possible to partly or completely download the image data and/or metadata provided by the cameras 5 within a specific time range. Besides the free definability of the time range, the type and number of subdivisions in this range can also be definable in this case. It is thus possible to achieve a reduction of the download volume and a greater diversity in the metadata.

A maximum number of persons is preferably stored in the image selection unit 8, wherein the image selection unit exclusively takes account of the images in which the associated number of persons is less than or equal to the defined maximum number of persons. These relevant images are subsequently combined with the associated metadata by the image selection unit 8 or downloaded and provided as analysis data.

This ensures the probability of enough background data being present for a subsequent process step.

The analysis device 6 furthermore comprises a database 9, wherein the database 9 comprises an interface for accepting the analysis data. The analysis data can for example be sorted according to their associated points in time of recording and/or the associated number of persons and be combined in the database 9.

The analysis device 6 comprises a person identifying unit 10 configured to identify and mark individual persons in the frames. In this case, the term persons is also understood to mean all objects carried by the persons, such as e.g. baby carriages, suitcases, bags, etc. For this purpose, the person identifying unit 10 comprises a masking module 11 and an AI module 12. The masking module 11 is configured, on the basis of the metadata or analysis data, to mark the moving persons 4 detected by the cameras 5, and if appropriate the objects carried by said persons, as image segments in the associated frame. The AI module 12 is configured, in parallel with the masking module 11, to use the analysis data in a frame method on the basis of deep learning, e.g. a deep learning segmentation algorithm, in order to mark unrecognized persons, e.g. sitting persons or persons standing still, in the associated frame as further image segments in the associated frame. In this case, the analysis data are processed by a neural network and the locations in the corresponding images at which a person is suspected are marked. The person identifying unit 10 is configured to combine the image segments of the corresponding frame that have been marked by the masking module 11 and the AI module 12 in a common mask image and to provide the latter to the further process.

The analysis device 6 comprises an image combining unit 13, wherein the image combining unit 13 is configured to compare a plurality of the mask images with one another and to replace correspondingly marked image segments with image segments without persons. In this case, for each pixel position, for example, the image combining unit 13 can capture all pixel values of all of the different mask images and sort them according to their color value. Afterward, it is possible to calculate a median pixel value for generating a median image as the background image which is privacy-compliant. Alternatively or optionally, provision can also be made for amply excluding or ignoring the marked image segments and calculating a mean value of all color values of the remaining mask images taking account of the excluded image segments in order to generate a mean value image as the background image which is privacy-compliant. The invention thus describes a method which ensures in a plurality of stages that the background image generated does not actually image any persons and the bandwidth or the volume of data per camera 5 is reduced to a minimum.

The analysis device 6 is connected to a terminal 14 in terms of signaling, wherein the terminal comprises an interface for accepting the background image which is privacy-compliant. By way of example, the terminal 14 is configured as a display unit and serves for displaying display data. The display unit 14 can be configured for graphical, image, video and/or text display. By way of example, the display indicated is configured as a display. By way of example, the display unit 14 can display the floor plan of the retail space, wherein the positions of the cameras 5 are displayed and/or displayable in the floor plan. The camera positions can be selected individually, wherein the background image which is privacy-compliant is superimposed with the floor plan as a camera image.

FIGS. 3 and 4 subsequently illustrate the sequence of the method in a schematic flow diagram, wherein FIG. 3 comprises steps S1 to S3 and FIG. 4 comprises steps S4 to S9.

In a first step S1, the analysis device 6 accesses the camera(s) 5. In this case, the image data B and/or metadata D provided by the camera 5 are evaluated within a specific time range T1<->T2. By way of example, the time range is defined at the point in time of the opening time of the store minus a variable time period, e.g. 30 min. In the exemplary embodiment shown, the store opens for example in the morning at 8:00 a.m., and so the access takes place from T1=7:30 a.m. to T2=8:00 a.m. This is intended to ensure that there are not yet any customers in the store, but the store owner/staff is/are already in the store in order to make preparations for the day ahead. It is thus possible to ensure that e.g. a light is switched on in the monitoring region 2 of the store, as a result of which visually appealing images B of the image data can be recorded by the cameras 5. Downloading the metadata and/or image data depending on the opening times increases the probability of being able to access image data in which no persons 4 are imaged in a later method step.

Alternatively, step S1 can also be used at arbitrary times during the day; by way of example, a recording in the past can be accessed for this purpose. Alternatively, the cameras 5 can also be accessed live, e.g. if no recording exists, or on the basis of statistics regarding the times of the day at which the fewest persons 4 should be expected.

After all the metadata D downloaded in step 1 have been strung together, on the basis of the metadata D in a second step S2 the image selection unit 8 searches for points in time Z which have a minimum number of persons P captured by the unit 7 for determining a number of persons. For this purpose, the maximum number of persons Pmax permitted to be present at a point in time Z is defined in the image selection unit 8. Optionally, a minimum time interval tmin between the points in time Z can be stored as a further parameter in the image selection unit 8. The minimum time interval tmin between the points in time Z thus ensures the best possible distribution and diversity of the downloaded image data B and/or metadata D.

With the knowledge of how many persons 4 are present at which point in time Z and/or which points in time Z contain the fewest persons 4, upon all conditions (Pmax and tmin) being met, the associated frame B can be loaded by the image selection unit 8. On the basis of the time range set, it is proposed that at different—e.g. randomly selected and/or with identical separation points in time Z one frame of metadata D in each case is downloaded. The points in time Z are sorted by the image selection unit 8 on the basis of the associated number of persons P and at least one or a plurality of images B (B<=Z) with a small number of persons P, preferably 0 moving persons 4 in the associated frame B, is/are picked out. The frames B picked out preferably have no or few detected/moving persons/objects.

In a third step S3, at each point in time Z (1 to N) the corresponding frame B from the camera 5 is loaded and combined with its already present metadata D in the database 9 as analysis data A. This can be done iteratively, for example, since it is not necessary that all corresponding frames B must be loaded immediately at the beginning.

In a fourth step S4, the data sets stored in the database 9 are processed in a loop. In this case, at a specific point in time Z the associated frame B and the associated metadata D are loaded from the database 9 and made available to the further process or the person identifying unit 10.

In a fifth step S5, by superimposing the frame B with the associated metadata D, the identified persons P1, P2 are marked as the image segments A1 in the frame B by the masking module 11. In this case, the image segments A are represented as rectangular boxes, for example, which are larger than the imaged persons P1, P2 themselves by a defined percentage, e.g. enlarged by 20%. A more probable complete delimitation of a person region is achieved as a result. By way of example, the size of the boxes can be set in a variable manner. The image segments A1 are subsequently noted in the system and made available to the subsequent process. As evident in this example, no metadata D exists for the seated person P3, and so consequently the masking module 11 will not mark this person.

For this purpose, a sixth step S6 implemented in parallel is provided, wherein the current frame B from the database 9, in parallel with the fifth step S5, is transferred to the AI module 12 and is processed by means of deep learning. The result obtained is a pixel-by-pixel classification in the frame B of where the persons P1, P3 are situated. The latter are marked as further image segments A2 (further rectangular boxes) in the frame B. The further image segments A2 are subsequently noted in the system and made available to the subsequent process. As evident in this example, in comparison with the fifth step S5, the seated person P3 is recognized, but the person P2 in the edge region of the frame B is not recognized. By way of example, further steps in parallel with steps S5 and S6 can exist and they recognize persons and/or specific object classes in the frame in order later to ensure that these are removed from the background image.

In a seventh step S7, a coupling and/or a superimposition of the marked image segments A1, A2 are/is carried out by the person identifying unit 10. In this case, all marked image segments A1, A2 where the persons P1, P2, P3 are very probably situated are combined in a common mask image M.

In an eighth step S8, the mask image M is added to a buffer or image stack BS. Afterward, steps S4 to S8 are repeated until all or enough frames B from the database 9 have been processed in order to computationally extract possible errors or unrecognized persons/objects in the subsequent step S9. If there are not enough frames B without moving persons/objects in the image segments A1, A2, step S4 must be repeated and the number of points in time Z in the second step S2 must be increased and/or the time range must be increased and thus the later number of frames B must be increased.

In the ninth step S9, the background image H which is privacy-compliant can be calculated by comparing all the mask images M of the image stack BS and by calculating a median or mean value image, as already described above. In this case, the image segments A1, A2 marked with the persons P1, P2, P3 are replaced with corresponding image segments A1', A2' without persons. This background image can be regarded as a privacy-compliant background image of the scene with high probability since, by means of a plurality of repetitions of process steps S4 to S8, it is very probable that persons are no longer represented in the background image H.

The proposed method thus uses the opening times of the store, the optical recordings of the cameras 5, and also one or more cloud-based frame methods on the basis of deep learning and/or a median image or mean value image method in order to ensure that the background image H which is output does not contain any persons and is thus privacy-compliant.

The invention claimed is:

1. An analysis device for analyzing image data of a camera (5), wherein the image data comprise a plurality of frames, the analysis device comprising:
a unit for determining a number of persons in the frames;
an image selection unit, wherein the image selection unit is configured to select one or more frames from the plurality of frames on the basis of the number of persons and to provide the selected one or more frames and the number of persons as analysis data;
a person identifying unit, wherein the person identifying unit (10) is configured to mark persons as image segments in the one or more frames and to provide the frames with the marked persons as mask images; and
an image combining unit, wherein the image combining unit is configured to replace the marked image segments with corresponding image segments without persons.

2. The analysis device as claimed in claim 1, wherein a maximum number of persons is stored in the image selection unit, wherein the image selection unit is configured to select the one or more frames by selecting one or more frames from the plurality of frames in which the associated number of persons is less than or equal to the stored maximum number of persons.

3. The analysis device as claimed in claim 1, wherein the image selection unit is configured to select the one or more frames by selecting at least one of the plurality of frames in at least one defined time range.

4. The analysis device as claimed in claim 3, wherein the image selection unit is configured to select the one or more frames by selecting a frame from the plurality of frames at each of a plurality of different points in a time in the at least one defined time range, wherein a minimum time interval between the plurality of different points in time is stored in the image selection unit.

5. The analysis device as claimed in claim 1, wherein the image combining unit is configured to replace the marked image segments in the mask images with a mean value of the color values of the corresponding image segments of further mask images.

6. The analysis device as claimed in claim 5, wherein the image combining unit is configured to exclude the image segments marked with persons during a calculation of the mean value at the respective image position of the corresponding image segments of the further mask images.

7. The analysis device as claimed in claim 1, wherein the person identifying unit comprises a masking module, wherein the masking module is configured to mark the persons in the one or more frames as the image segments on the basis of the analysis data.

8. The analysis device as claimed in claim 1, wherein the person identifying unit comprises an AI module, wherein the AI module is configured to learn to detect persons in the plurality of frames.

9. The analysis device as claimed in claim 8, wherein the person identifying unit is configured to combine the image segments marked by at least one selected from a group consisting of the masking module and the AI module and to provide the combined image segments as the mask images.

10. The analysis device as claimed in claim 1, further comprising a database, wherein the database is configured to store at least one of the plurality of frames with the associated number of persons as the analysis data.

11. A monitoring assembly for monitoring a monitoring region the monitoring assembly comprising:
an analysis device configured to determine a number of persons in a plurality of frames, select one or more frames from the plurality of frames on the basis of the number of persons, mark persons as image segments in the one or more frames to create mask images, and replace the marked image segments with corresponding image segments without persons; and
at least one camera, wherein the at least one camera provides the captured monitoring region as image data including the plurality of frames.

12. The monitoring assembly as claimed in claim 11, wherein the monitoring region is configured as a retail space, wherein the monitoring assembly is configured to analyze a retail behavior in the retail space.

13. A method for determining a background image, the method comprising:
receiving image data from at least one camera, wherein the image data comprise a plurality of frames;
determining a number of persons in the plurality of frames;
selecting one or more frames from the plurality of frames based on the number of persons in the plurality of frames;
marking persons as image segments in the one or more frames; and
replacing the marked image segments with corresponding image segments without persons.

14. The method as claimed in claim 13, wherein selecting the one or more frames from the plurality of frames based on the number of persons in the plurality of frames includes selecting a frame from the plurality of frames wherein the number of persons in the frame is less than or equal to a maximum number of persons.

* * * * *